(12) United States Patent
Takeichi et al.

(10) Patent No.: US 7,664,600 B2
(45) Date of Patent: Feb. 16, 2010

(54) OBSTACLE DETECTION DEVICE

(75) Inventors: Masakazu Takeichi, Okazaki (JP);
Masahisa Makino, Nagoya (JP);
Kenichiro Horikawa, Hamamatsu (JP)

(73) Assignee: Denso Corporation, Kariya (JP)

( * ) Notice: Subject to any disclaimer, the term of this patent is extended or adjusted under 35 U.S.C. 154(b) by 295 days.

(21) Appl. No.: 11/431,073

(22) Filed: May 10, 2006

(65) Prior Publication Data

US 2006/0271296 A1 Nov. 30, 2006

(30) Foreign Application Priority Data

May 10, 2005 (JP) ............... 2005-137681
May 10, 2005 (JP) ............... 2005-137682

(51) Int. Cl.
*G06G 7/78* (2006.01)
(52) U.S. Cl. .................. 701/300; 340/435; 342/42; 342/59; 367/98; 367/117
(58) Field of Classification Search ........... 701/300; 340/435, 961, 932.2; 73/579; 342/72, 42, 342/52, 59; 382/103; 367/98, 117; *G06G 7/78*
See application file for complete search history.

(56) References Cited

U.S. PATENT DOCUMENTS

| 4,932,024 | A | * | 6/1990 | Bonicioli et al. ............. 370/458 |
| 5,808,968 | A | | 9/1998 | Sekine |
| 7,225,158 | B2 | * | 5/2007 | Toshikage et al. ............. 705/51 |
| 7,336,262 | B2 | * | 2/2008 | Tsuji ........................... 345/173 |
| 2002/0026310 | A1 | * | 2/2002 | Mochida et al. ............. 704/201 |
| 2004/0088079 | A1 | * | 5/2004 | Lavarec et al. .............. 700/258 |
| 2004/0107030 | A1 | * | 6/2004 | Nishira et al. ................. 701/36 |
| 2004/0119634 | A1 | * | 6/2004 | Samukawa et al. ............ 342/70 |
| 2004/0136270 | A1 | * | 7/2004 | Gal et al. ...................... 367/98 |
| 2004/0183661 | A1 | * | 9/2004 | Bowman .................... 340/435 |
| 2004/0189452 | A1 | * | 9/2004 | Li .............................. 340/435 |
| 2004/0217851 | A1 | * | 11/2004 | Reinhart ..................... 340/435 |
| 2005/0128060 | A1 | * | 6/2005 | Rennick et al. ............. 340/435 |
| 2005/0139013 | A1 | * | 6/2005 | Hashimoto et al. ........ 73/861.27 |
| 2005/0169530 | A1 | * | 8/2005 | Nakai et al. ................. 382/190 |

(Continued)

FOREIGN PATENT DOCUMENTS

DE 33 47 442 A1 7/1985

(Continued)

OTHER PUBLICATIONS

German Examination Report issued Jun. 26, 2007 in German Application No. 10 2006 019 833.6-35, with English translation.

(Continued)

*Primary Examiner*—Tuan C To
(74) *Attorney, Agent, or Firm*—Nixon & Vanderhye PC

(57) ABSTRACT

Each of plural detection units performs a signal transmission-reception operation responding to at least one of a plurality of kinds of operation timing signals repeated at a predetermined periodicity. The number of continuous reception times of the reflection signal is counted and used to determine obstacle detection when the number of counts is larger than or equal to a predetermined value. The transmission-reception operations are controlled by an operation timing signal having a periodicity shorter than the predetermined periodicity.

26 Claims, 8 Drawing Sheets

U.S. PATENT DOCUMENTS

| | | | |
|---|---|---|---|
| 2005/0173153 A1* | 8/2005 | Alft et al. | 175/46 |
| 2005/0237168 A1* | 10/2005 | Matsukawa et al. | 340/435 |
| 2005/0253693 A1* | 11/2005 | Rennick et al. | 340/435 |
| 2005/0253807 A1* | 11/2005 | Hohmann et al. | 345/156 |
| 2006/0071764 A1* | 4/2006 | Lynch | 340/435 |
| 2006/0076917 A1* | 4/2006 | Lim et al. | 318/568.12 |
| 2006/0176160 A1* | 8/2006 | Zoratti et al. | 340/435 |

FOREIGN PATENT DOCUMENTS

| | | |
|---|---|---|
| DE | 35 13 270 A1 | 10/1986 |
| DE | 35 40 704 A1 | 5/1987 |
| JP | A-62-70779 | 4/1987 |
| JP | A-63-128278 | 5/1988 |
| JP | A-4-250388 | 9/1992 |
| JP | U-7-6779 | 1/1995 |
| JP | 9-96674 | 4/1997 |
| JP | A-2004-45320 | 2/2004 |
| JP | 2004-85214 | 3/2004 |
| JP | 2004306909 A * | 11/2004 |
| JP | 2005003397 A * | 1/2005 |

OTHER PUBLICATIONS

Office Action dated Aug. 19, 2008 in JP Application No. 2005-137681 with English translation.

Office Action dated Aug. 19, 2008 in JP Application No. 2005-137682 with English translation.

* cited by examiner

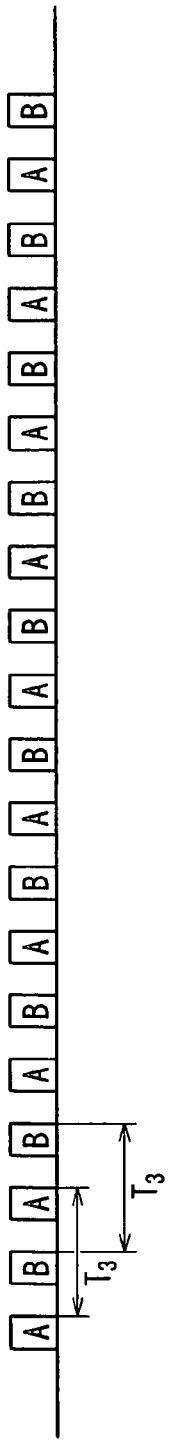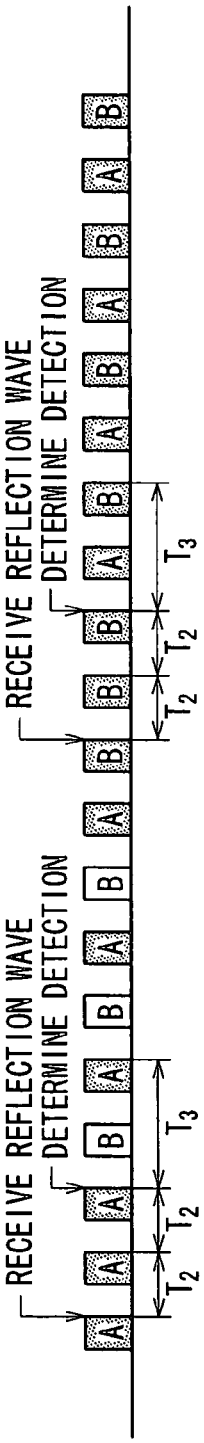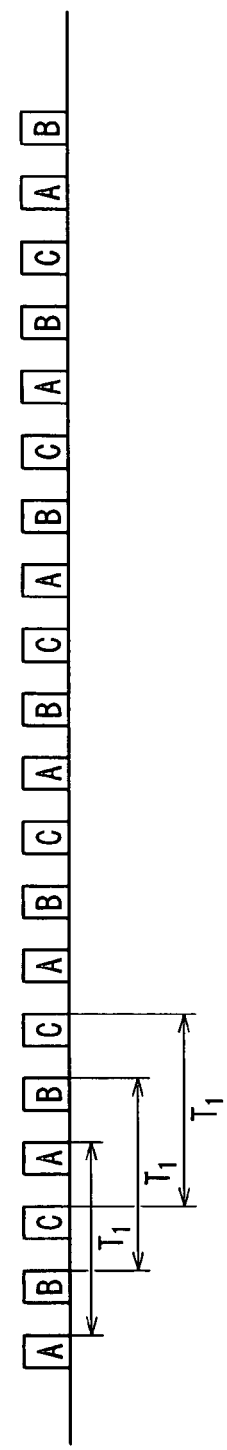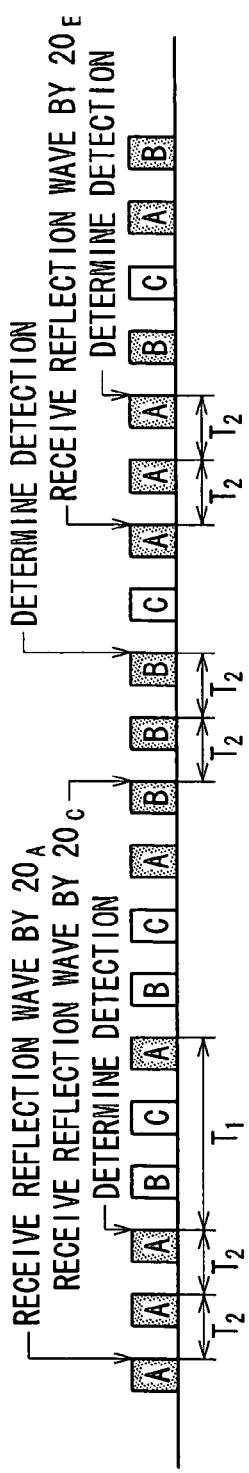

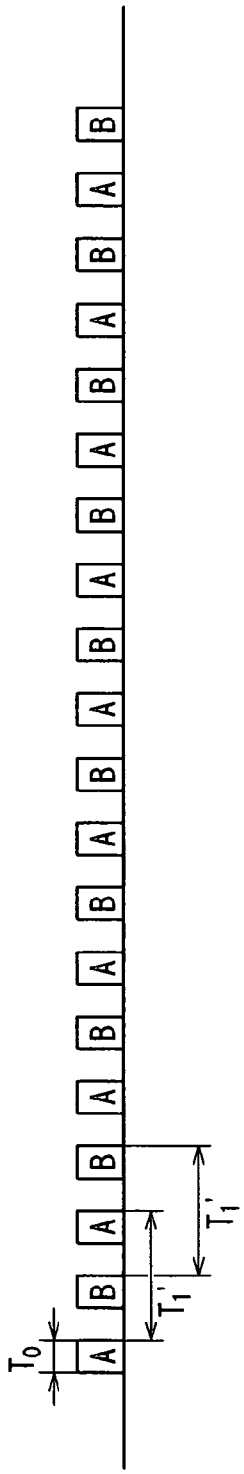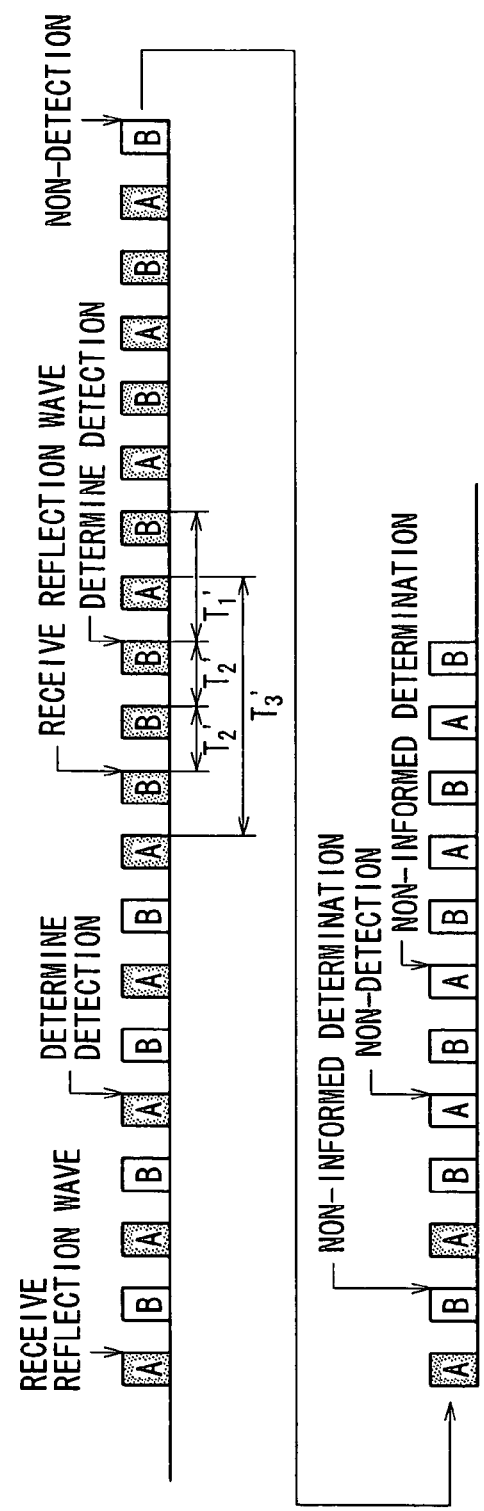

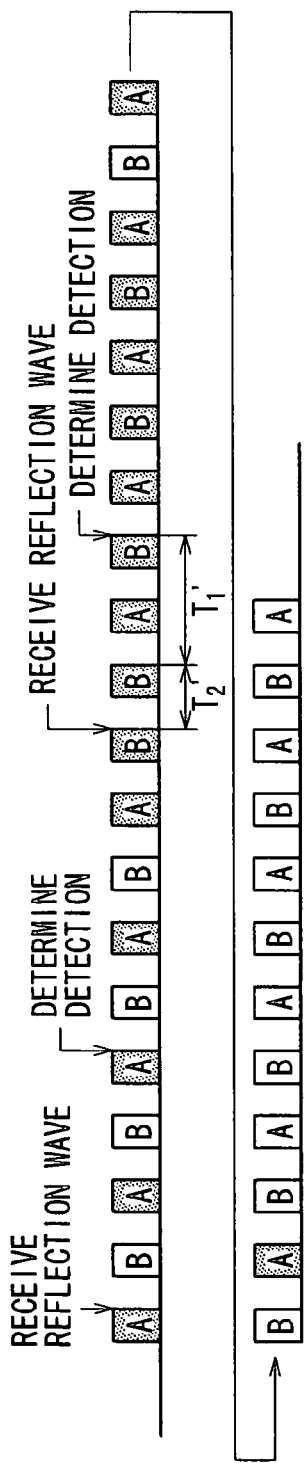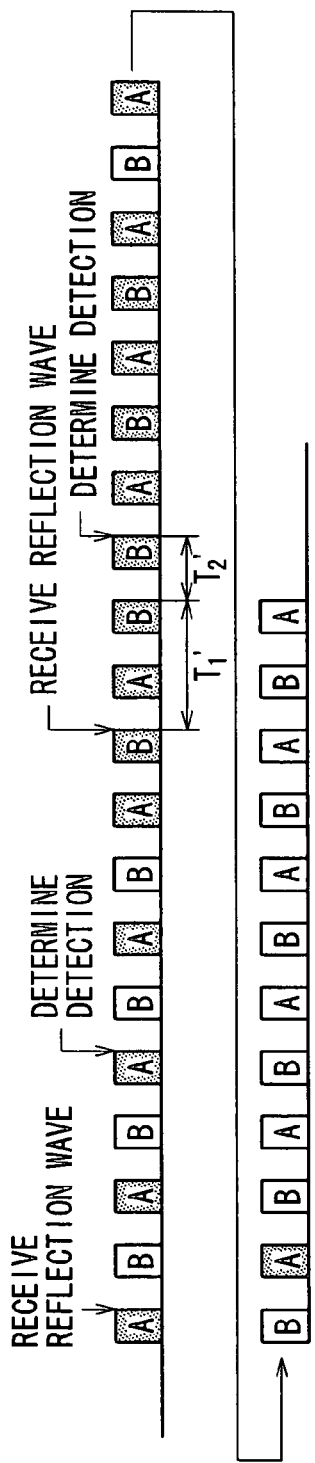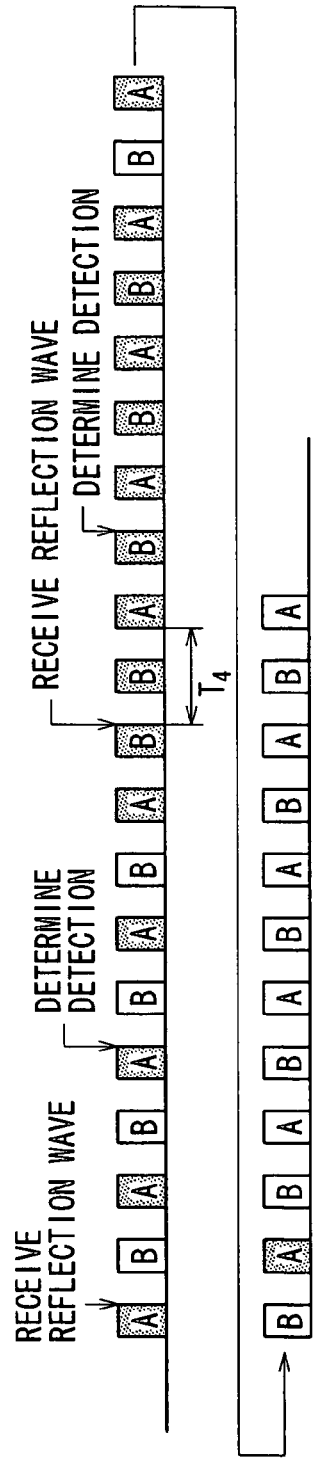

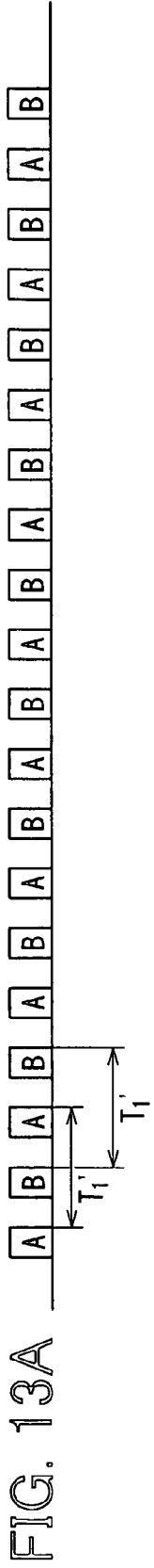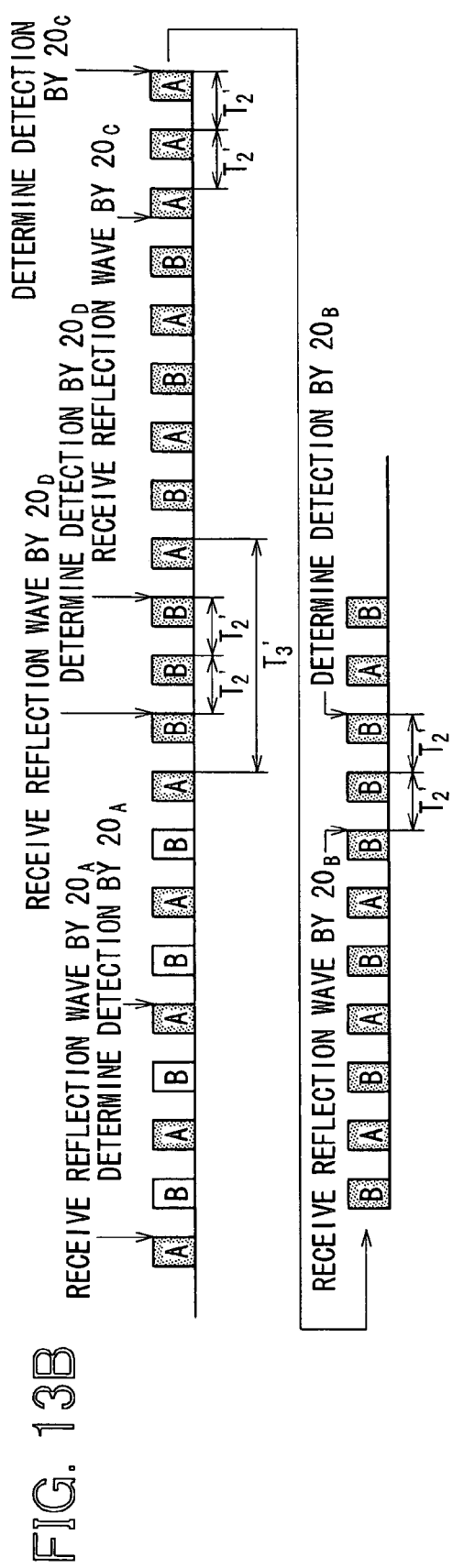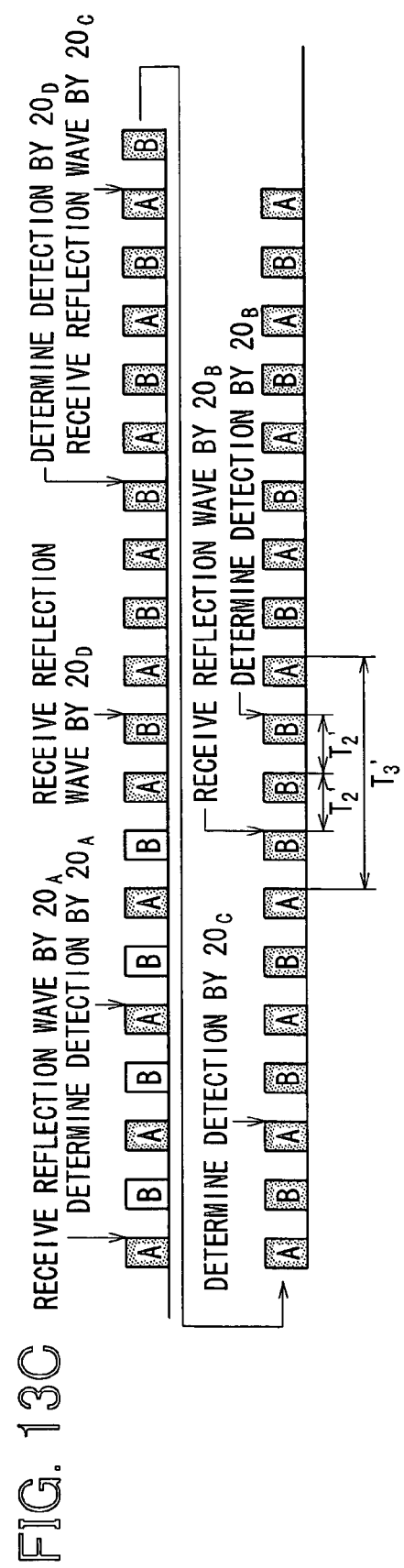

OBSTACLE DETECTION DEVICE

CROSS REFERENCE TO RELATED APPLICATION

This application is based on Japanese Patent Applications No. 2005-137682 filed on May 10, 2005 and No. 2005-137681 filed on May 10, 2005, the disclosure of which is incorporated herein by reference.

FIELD OF THE INVENTION

The present invention relates to an obstacle detection device for detecting an obstacle, for example, around a vehicle. The obstacle detection device is capable of determining an obstacle detection by a shortened time.

BACKGROUND OF THE INVENTION

Generally, for example, referring to U.S. Pat. No. 5,808,968 (JP-3221821-B2), an obstacle detection device for detecting an obstacle around a vehicle is provided with multiple ultrasound sensors which are arranged at a front bumper and a rear bumper of the vehicle. The ultrasound sensor is provided with ultrasound transmission-reception operation responding to one of multiple kinds of operation timing signals, each of which is repeated at a predetermined periodicity. Multiple detection areas around the vehicle are allotted to the ultrasound sensors. The ultrasound transmission-reception operation of the ultrasound sensor includes sending ultrasound burst to the detection area allotted thereto, and receiving ultrasound burst (reflection wave) reflected from the detection area.

In the case where there exists an obstacle in the detection area, the ultrasound sensor to which the detection area is allotted will receive the reflection wave reflected by the obstacle. Thus, the obstacle in this detection area can be detected, and an information operation is performed to inform the existence of the obstacle to a driver of the vehicle. The ultrasound sensor also receives signals other than the reflection wave, that is, noise. In order to eliminate the influence of noise, the information operation is performed when the ultrasound sensor continuously received the reflection wave for multiple times.

It is preferable to determine the detection of the obstacle as early as possible, while eliminating error information due to noise. Therefore, after the one ultrasound sensor commenced to receive the reflection wave, it is necessary for the one ultrasound sensor to perform the transmission-reception operation for the multiple times during the short time. On the other hand, the necessity for the ultrasound senor (other than the one ultrasound sensor) of the detection area where the obstacle detection has been determined to perform the transmission-reception operation during a short time becomes low, because the existence of the obstacle therein has been informed to the driver. In this case, it is preferable for the performance of the transmission-reception operation of the one ultrasound sensor which commenced to receive the reflection wave (that is, obstacle detection via the one detection unit is not determined yet) to have precedence over the other ultrasound sensor, which has received the reflection wave for the multiple times so that the obstacle detection has been determined. Thus, the obstacle detection via the one ultrasound sensor which commenced to receive the reflection wave can be early determined.

However, according to the obstacle detection device with reference to U.S. Pat. No. 5,808,968 (JP-3221821-B2), the ultrasound transmission-reception operations of the ultrasound sensors are performed at a predetermined periodicity regardless of development of determinations of the obstacle detections via the ultrasound sensors (that is, regardless of reflection-wave reception states of ultrasound sensors). Thus, it is difficult to early perform the detection of the obstacle in need of determination.

SUMMARY OF THE INVENTION

In view of the above-described disadvantages, it is an object of the present invention to provide an obstacle detection device, which is capable of early determining an obstacle detection while restricting an error information due to noise.

According to the present invention, an obstacle detection device has a plurality of detection units which are respectively assigned to a plurality of detection areas to perform transmission-reception operations each of which includes send of detection signal to the detection area allotted thereto and reception of reflection signal from the detection area, an operation control unit which controls the detection unit so that the detection unit performs the signal transmission-reception operation responding to at least one of a plurality of operation timings which are repeated at a predetermined periodicity, and a determination unit which counts a number of continuous reception times of the reflection signal of each of the detection units and determines a detection of an obstacle in the detection area allotted to the detection unit when the number of the continuous reception times of the detection unit is larger than or equal to a predetermined value. The operation timing of the transmission-reception operation of the detection unit which commenced to receive the reflection signal is provided by the operation control unit with a periodicity shorter than the predetermined periodicity.

Thus, in the case where the one detection unit commenced to receive the reflection signal, the sequent periodicity of the transmission-reception operation of the detection unit is converted to be shorter than the predetermined periodicity, to which the detection unit responds when not-receiving the reflection signal. When the number of the continuous reception times of the reflection signal of the detection unit is larger than or equal to the predetermined value, it is determined that there exists the obstacle in the detection area allotted to the detection unit.

Therefore, the obstacle detection can be early determined while the influence of noise signal can be restricted. Moreover, the periodicity of the operation timing can be converted responding to different main aims, for example, at shortening of the time elapsed till the determination of the obstacle detection, and at elimination of the influence of noise signal and the like.

Preferably, the transmission-reception operations of the plurality of the detection units are sequentially performed. When the one detection unit commenced to receive the reflection signal, a sequent periodicity of the operation timing to which the one detection unit responds is controlled to be shorter than the predetermined periodicity and a periodicity of the different operation timing from that of the one detection unit is controlled to be longer than the predetermined periodicity, on condition that an obstacle detection via the other detection unit has been determined and a reception of the reflection signal by the other detection unit is continuous. The other detection unit performs the transmission-reception operation at the different operation timing from that of the one detection unit.

Thus, when the one detection unit commenced to receive the reflection signal, the periodicity of the operation timing of the one detection unit is converted to be shorter than the predetermined periodicity and the periodicity of the operation timing of the other detection unit becomes longer than the predetermined periodicity, on condition that the obstacle detection via the other detection unit has been determined and the reception of the reflection signal by the other detection unit is continuous. The other detection unit performs the transmission-reception operation at the different operation timing from that of the one detection unit.

Therefore, the performance of the transmission-reception operation of the detection unit which commenced to receive the reflection wave (that is, obstacle detection via the detection unit is not determined yet) has precedence over that of the detection unit via which the obstacle detection has been determined. Thus, the obstacle detection in need of determination can be early performed.

Moreover, the periodicity of the operation timing can be converted responding to different main aims, for example, at shortening of the time elapsed till the determination of the obstacle detection, and at elimination of the influence of noise and the like.

More preferably, the transmission-reception operations of the plurality of the detection units are sequentially performed. When the one detection unit commenced to receive the reflection signal, an average of sequent periodicities of the operation timing to which the one detection unit responds is controlled to be shorter than the predetermined periodicity and a periodicity of the different operation timing from that of the one detection unit is delayed a predetermined period, on condition that an obstacle detection via the other detection unit has been determined and a reception of the reflection signal by the other detection unit is continuous. The other detection unit performs the transmission-reception operation at the different operation timing from that of the one detection unit.

Thus, when the one detection unit commenced to receive the reflection signal, the operation timing of the other detection unit where the obstacle detection have been determined is delayed the predetermined period and the transmission-reception operation of the one detection unit is performed during the predetermined period, on condition that the obstacle detection via the other detection unit has been determined and the reception of the reflection signal by the other detection unit is continuous. The other detection unit performs the transmission-reception operation at the different operation timing from that of the one detection unit.

Therefore, the performance of the transmission-reception operation of the detection unit which commenced to receive the reflection wave has precedence over that of the detection unit via which the obstacle detection has been determined. Thus, the obstacle detection in need of determination can be early performed.

BRIEF DESCRIPTION OF THE DRAWINGS

Other objects, features and advantages of the present invention will become more apparent from the following detailed description made with reference to the accompanying drawings, in which:

FIG. 3A is a time chart showing a periodicity of transmission-reception operations when none of ultrasound sensors receives reflection wave according to a modification of the first embodiment, and FIG. 3B is a time chart showing a conversion of the periodicity of the transmission-reception operations when the ultrasound sensors receive the refection wave according to the modification of the first embodiment;

FIG. 6A is a time chart showing a periodicity of transmission-reception operations when none of ultrasound sensors receives reflection wave according to the second embodiment, and FIG. 6B is a time chart showing a conversion of the periodicity of the transmission-reception operations when the ultrasound sensors receive the refection wave according to the second embodiment;

FIG. 8A is a time chart showing a periodicity of transmission-reception operations when none of ultrasound sensors receives reflection wave according to the third embodiment, and FIGS. 8B and 8C are time charts respectively showing various conversions of the periodicity of the transmission-reception operations when the ultrasound sensors receive the refection wave according to the third embodiment;

FIGS. 9A and 9B are time charts showing other conversions of the periodicity of the transmission-reception operations when the ultrasound sensors receive the refection wave according to the third embodiment;

FIG. 10 is a time chart showing further other conversion of the periodicity of the transmission-reception operations when the ultrasound sensors receive the refection wave according to the third embodiment;

FIG. 13A is a time chart showing a periodicity of transmission-reception operations when none of ultrasound sensors receives reflection wave according to the fourth embodiment, and FIGS. 13B and 13C are time charts respectively showing various conversions of the periodicity of the transmission-reception operations when the ultrasound sensors receive the refection wave according to the fourth embodiment.

DETAILED DESCRIPTION OF THE EXAMPLE EMBODIMENTS

First Embodiment

Figure 1:
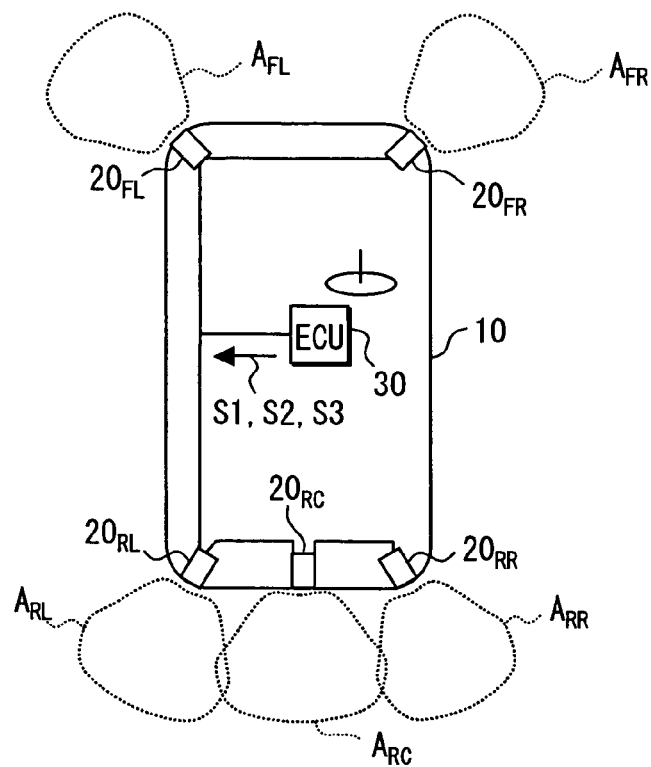
FIG. 1 is a schematic view showing a whole construction of an obstacle detection device according to a first embodiment of the present invention.

An obstacle detection device according to a first embodiment of the present invention will be described with reference to FIGS. 1-3B. In this case, the obstacle detection device is suitably used for a vehicle to detect an obstacle around the vehicle. The obstacle detection device has an ECU 30 and multiple detection units (e.g., ultrasound sensors $20_{FR}$, $20_{FL}$, $20_{RR}$, $20_{RC}$ and $20_{RL}$) The ultrasound sensors $20_{FR}$, $20_{FL}$, $20_{RR}$, $20_{RC}$ and $20_{RL}$ (constructing ultrasound sensor system 20) are connected with the ECU 30 through a bus or the like.

The ultrasound sensors $20_{FR}$ and $20_{FL}$ are respectively attached to a right end and a left end of a front bumper of a vehicle chassis 10. The ultrasound sensors $20_{RR}$, $20_{RC}$ and $20_{RL}$ are respectively attached to a right end, a right-left-direction center portion, and a left end of a rear bumper of the vehicle chassis 10. Detection areas $A_{FR}$, $A_{FL}$, $A_{RR}$, $A_{RC}$ and $A_{RL}$ around the vehicle are respectively allotted to the ultrasound sensors $20_{FR}$, $20_{FL}$, $20_{RR}$, $20_{RC}$ and $20_{RL}$.

Each of the ultrasound sensors $20_{FR}$, $20_{FL}$, $20_{RR}$, $20_{RC}$ and $20_{RL}$ performs a ultrasound transmission-reception operation (signal transmission-reception operation), for sending ultrasound burst (send wave) to the detection area allotted thereto and receiving ultrasound burst (reflection wave) reflected by an obstacle in the case where the obstacle exists in the detection area. Moreover, the transmission-reception operation includes a send of a reflection signal responding to the reflection wave to the ECU 30.

The ECU 30 can be mainly constructed of, for example, a microcomputer. In this case, the ECU 30 has a CPU, ROM, RAM, I/O and the like which are connected with each other through bus lines or the like. In this embodiment, for example, the ECU 30 functions as an operation control unit and a determination unit. The ECU 30 selectively sends at least one of multiple kinds of operation timing signals S1-S3 to the ultrasound sensor $20_{FR}$, $20_{FL}$, $20_{RR}$, $20_{RC}$, $20_{RL}$, while determining a detection of an obstacle at the detection area $A_{FR}$, $A_{FL}$, $A_{RR}$, $A_{RC}$, $A_{RL}$ allotted thereto based on the reflection wave (reflection signal) from the ultrasound sensor $20_{FR}$, $20_{FL}$, $20_{RR}$, $20_{RC}$, $20_{RL}$.

That is, the ECU 30 controls a wave-sending timing of the send wave of the ultrasound sensor $20_{FR}$, $20_{FL}$, $20_{RR}$, $20_{RC}$, $20_{RL}$ by selectively sending at least one of the multiple kinds of operation timing signals S1-S3 to the ultrasound sensor $20_{FR}$, $20_{FL}$, $20_{RR}$, $20_{RC}$, $20_{RL}$, so that the ultrasound sensor $20_{FR}$, $20_{FL}$, $20_{RR}$, $20_{RC}$, $20_{RL}$ performs the transmission-reception operation responding to the operation timing signal sent thereto. Moreover, the ECU 30 determines the obstacle detection in the detection area allotted to the ultrasound sensor $20_{FR}$, $20_{FL}$, $20_{RR}$, $20_{RC}$, $20_{RL}$, when the number of continuous wave-reception times (continuous reception times) of reflection wave of the ultrasound sensor $20_{FR}$, $20_{FL}$, $20_{RR}$, $20_{RC}$, $20_{RL}$ is larger than or equal to a predetermined value.

The ECU 30 calculates the time elapsed between transmission of the send wave and reception of the reflection wave by each of the ultrasound sensors $20_{FR}$, $20_{FL}$, $20_{RR}$, $20_{RC}$ and $20_{RL}$, within a predetermined detection time T0 (referring to FIG. 2) after the operation timing signal S1, S2, S3 is sent. Thus, the ECU 30 calculates a distance between the vehicle and the obstacle based on the elapse time and sound velocity.

Moreover, the ECU 30 counts the number of the continuous reception times of the reflection wave of each of the ultrasound sensors $20_{FR}$, $20_{FL}$, $20_{RR}$, $20_{RC}$ and $20_{RL}$. In this embodiment, in order to eliminate the influence of noise, the existence of the obstacle is determined on condition that the reflection wave is continuously received for multiple times.

Specifically, when the number of the continuous reception times of the single ultrasound sensor $20_{FR}$, $20_{FL}$, $20_{RR}$, $20_{RC}$ or $20_{RL}$ is larger than or equal to the predetermined value (e.g., 3), it is determined that there exists an obstacle in the detection area assigned to the ultrasound sensor $20_{FR}$, $20_{FL}$, $20_{RR}$, $20_{RC}$ or $20_{RL}$. Thus, the existence of the obstacle is informed to a driver of the vehicle by, for example, sounding a buzzer attached to the vehicle, indicating the existence of the obstacle on an indicator or the like.

Each of the operation timing signals S1-S3 output from the ECU 30 is provided with a predetermined periodicity T1. That is, the operation timing signal S1, S2, S3 is repeated at the predetermined periodicity T1. Phases of the operation timing signals S1-S3 are different from each other, and a phase difference larger than or equal to the detection time T0 is provided therebetween. Moreover, the phase difference between the operation timing signals S3 and S1 is larger than that between the operation timing signals S2 and S1. Thus, the operation timing signals S1, S2 and S3 are output in sequence.

In this embodiment, the ultrasound sensors $20_{RL}$ and $20_{FR}$ are set to respond to the operation timing signal S1, the ultrasound sensor $20_{RC}$ is set to respond to the operation timing signal S2, and the ultrasound sensors $20_{RR}$ and $20_{FL}$ are set to respond to the operation timing signal S3. Thus, each of the ultrasound sensors $20_{RL}$, $20_{RC}$ and $20_{RR}$ performs the transmission-reception operation at the predetermined periodicity T1. The transmissions-reception operations of the ultrasound sensors $20_{RL}$, $20_{RC}$ and $20_{RR}$ are performed in the sequence of the ultrasound sensors $20_{RL}$, $20_{RC}$ and $20_{RR}$.

Figure 2A:
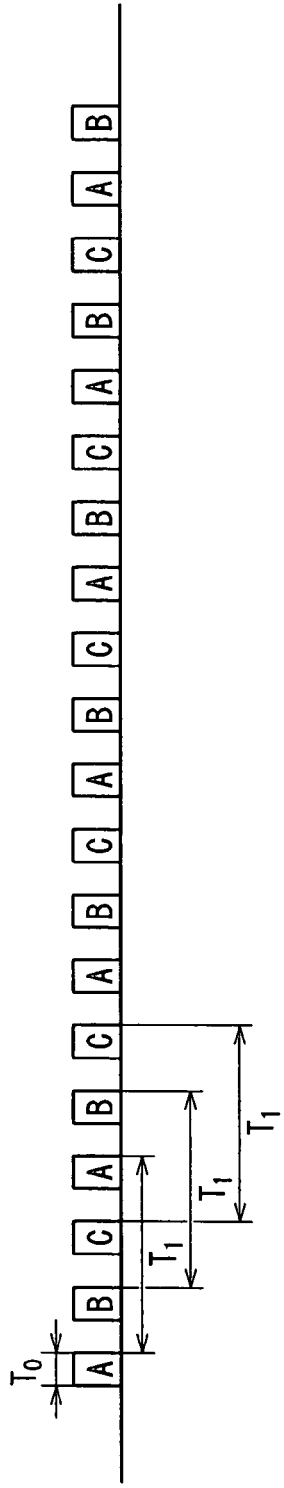
FIG. 2A is a time chart showing a periodicity of transmission-reception operations when none of ultrasound sensors receives reflection wave according to the first embodiment.

Referring to FIG. 2A, the transmissions-reception operations of the ultrasound sensors $20_{FR}$ and $20_{FL}$ are performed respectively in synchronization with those of the ultrasound sensors $20_{RL}$ and $20_{RR}$. As shown in FIGS. 2A-2D, "A" indicates the operation timing of the ultrasound sensor $20_{RL}$, $20_{FR}$ responding to the operation timing signal S1. "B" indicates the operation timing of the ultrasound sensor $20_{RC}$ responding to the operation timing signal S2. "C" indicates the operation timing of the ultrasound sensor $20_{RR}$, $20_{FL}$ responding to the operation timing signal S3.

Next, the operation of the obstacle detection device according to the first embodiment will be described.

The ECU 30 selectively sends at least one of the multiple kinds of operation timing signals S1-S3 to each of the ultrasound sensors $20_{FR}$, $20_{FL}$, $20_{RR}$, $20_{RC}$ and $20_{RL}$. Thus, each of the ultrasound sensors $20_{FR}$, $20_{FL}$, $20_{RR}$, $20_{RC}$ and $20_{RL}$ performs the ultrasound transmission-reception operation. That is, the ultrasound sensor $20_{FR}$, $20_{FL}$, $20_{RR}$, $20_{RC}$, $20_{RL}$ transmits the send wave to the detection area assigned thereto, and receives the reflection wave from the detection area. In the case where none of the ultrasound sensors $20_{FR}$, $20_{FL}$, $20_{RR}$, $20_{RC}$ and $20_{RL}$ receives the reflection wave, the transmission-reception operation of each of the ultrasound sensors $20_{FR}$, $20_{FL}$, $20_{RR}$, $20_{RC}$ and $20_{RL}$ is performed at the periodicity T1, as shown in FIG. 2A.

Figure 2B:
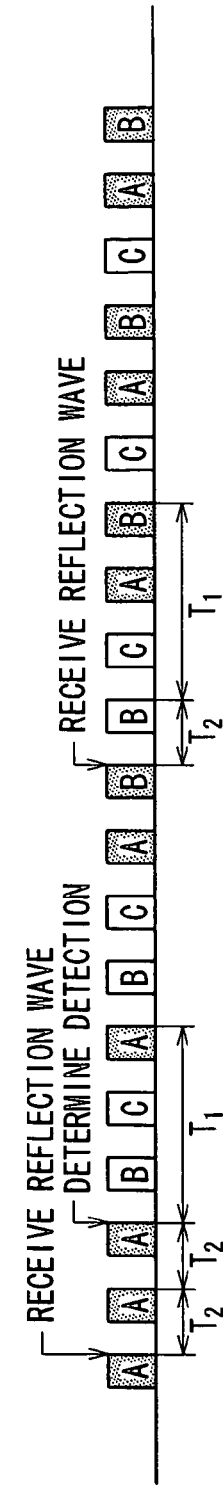
FIGS. 2B, 2C and 2D are time charts respectively showing various conversions of the periodicity of the transmission-reception operations when the ultrasound sensors receive the refection wave according to the first embodiment.

Referring to FIG. 2B, when the ultrasound sensor $20_{RL}$ or the like receives the reflection wave (as shown by point-filled-in boxes of "A", "B", "C" in figure), the ECU 30 commences to count the number of the continuous reception times of the ultrasound sensor $20_{RL}$ or the like.

In this case, when the ultrasound sensor $20_{RL}$ commenced to receive the reflection wave (that is, obstacle detection via ultrasound sensor $20_{RL}$ is not determined yet), the periodicity of the operation timing signal S1 (to which ultrasound sensor $20_{RL}$ responds) is controlled by the ECU 30 to become a periodicity T2 which is shorter than the predetermined periodicity T1, while the periodicity of the operation timing signal S2, S3 is controlled by the ECU 30 to become longer than the predetermined periodicity T1. Thus, the periodicity of the ultrasound transmission-reception operation of the ultrasound sensor $20_{RL}$ becomes the periodicity T2 which is shorter than T1, as shown in FIG. 2B.

In the case where the number of the continuous wave-reception times of the ultrasound sensor $20_{RL}$ reaches "3", it is determined that an obstacle is detected in the detection area allotted to the ultrasound sensor $20_{RL}$. Thus, the buzzer, the indicator or the like is actuated, to inform the existence of the obstacle to the driver. Therefore, the obstacle detection can be determined earlier while the influence of noise can be restricted.

As described above, in the case where the number of the continuous wave-reception times of the ultrasound sensor $20_{FR}$, $20_{FL}$, $20_{RR}$, $20_{RC}$, $20_{RL}$ reaches 3, the detection of the obstacle in the detection area allotted thereto is determined and informed to the driver. Therefore, the function for determining the existence of the obstacle in this detection area has been completed. Thus, the necessity to shorten the periodicity of the transmission-reception operation of the ultrasound sensor $20_{FR}$, $20_{FL}$, $20_{RR}$, $20_{RC}$, $20_{RL}$ becomes low. In this case, if the periodicity of the transmission-reception operation is kept short, the influence of noise will become large. Therefore, it is preferable that the periodicity of the transmission-reception operation is shortened when being necessary.

Therefore, when the number of the continuous wave-reception times of the ultrasound sensor $20_{FR}$, $20_{FL}$, $20_{RR}$, $20_{RC}$, $20_{RL}$ has reached "3", the periodicity thereof is converted back into the predetermined periodicity T1. Thus, the influence of noise can be substantially restricted.

Moreover, in the case where the reception of the reflection wave of the ultrasound sensor $20_{FR}$, $20_{FL}$, $20_{RR}$, $20_{RC}$, $20_{RL}$ dies before the number of the continuous wave-reception times reaches "3", the periodicity thereof is also converted back into the predetermined periodicity T1. For example, in the case where the ultrasound sensor $20_{RC}$ receives the reflection wave and thereafter the reception of the reflection wave dies so that the number of the continuous wave-reception times is smaller than "3", the sequent periodicity (i.e., periodicity after cease of reception of reflection wave) of the ultrasound sensor $20_{RC}$ is converted back into the predetermined periodicity T1. In this case, it is considered that the ultrasound sensor $20_{RC}$ has received noise signal. Because there is no obstacle in the detection area allotted to the ultrasound sensor $20_{RC}$, it is unnecessary to shorten the periodicity of the transmission-reception operation of the ultrasound sensor $20_{RC}$. On the other hand, if the periodicity of the transmission-reception operation of the ultrasound sensor $20_{RC}$ is kept short, the influence from continuous noise signal will become large. According to this embodiment, the periodicity of the transmission-reception operation of, for example, the ultrasound sensor $20_{RC}$, is converted back into the predetermined periodicity T1 so that the influence of noise can be substantially restricted.

Figure 2C:
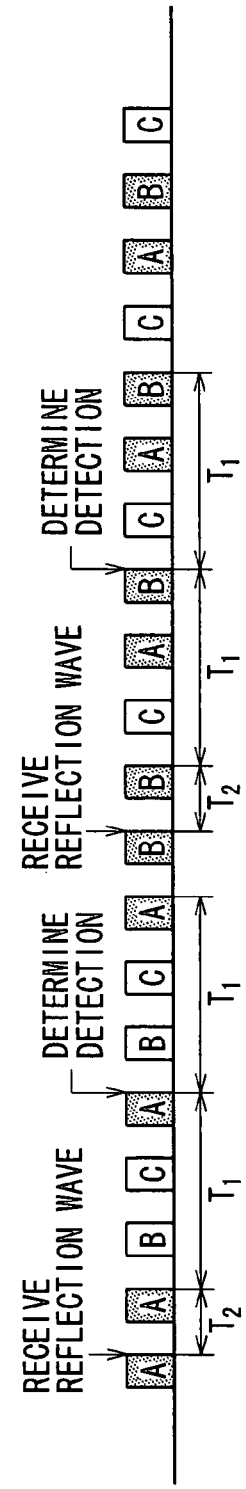

Alternatively, the periodicity of the operation timing signal S1, S2, S3 can be also converted as shown in FIG. 2C. In this case, the operation timing signal (e.g., S1) of the ultrasound sensor (e.g., $20_{RL}$) which commenced to receive the reflection wave, is provided with one periodicity of T2 (which is shorter than periodicity T1) immediately after the reception of the reflection wave, and a sequent periodicity (after the one periodicity of T2) of T1. That is, the periodicity T2 is converted back into the predetermined periodicity T1.

Figure 2D:
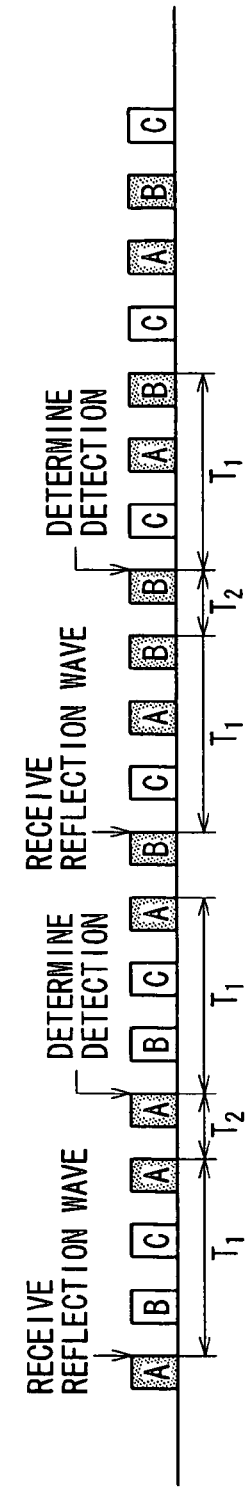

More alternatively, the periodicity of the operation timing signal S1, S2, S3 can be also converted as shown in FIG. 2D. In this case, the operation timing signal (e.g., S1) of the ultrasound sensor (e.g., $20_{RL}$) which commenced to receive the reflection wave is provided with one periodicity of T1 immediately after the reception of the reflection wave, and a sequent periodicity (after the one periodicity of T1) of T2 which is shorter than the predetermined periodicity T1.

More alternatively, the periodicity of the operation timing signal S1, S2, S3 can be also controlled responding to a traveling state or a traveling ambient of the vehicle, when the ultrasound sensor system 20 receives the reflection wave. In this case, the traveling state and the traveling ambient of the vehicle can be detected based on operation information from a vehicle velocity sensor, a shift sensor for detecting a shift position, a steering angle sensor for detecting a steering angle of a steering wheel, a rain sensor for detecting raindrop, a light control system or the like of the vehicle.

The periodicity of the operation timing signal S1, S2, S3 can be controlled as shown in FIG. 2B, in the case where an early determination of the obstacle detection is preferred when the vehicle has a high traveling velocity or the obstacle is difficultly visually identified at night or the like, for example. In the case where the elimination of the influence of noise signal such as reflection wave from raindrop and the like is preferred, the periodicity of the operation timing signal S1, S2, S3 can be controlled as shown in FIG. 2C or FIG. 2D.

Moreover, when the ultrasound sensor arranged at the side of a steering direction of the vehicle receives the reflection wave, the possibility of the existence of the obstacle positioned at a scheduled path of the vehicle is high so that it is necessary to early determine the detection of the obstacle and inform that to the driver. In this case, the periodicity of the operation timing signal of the ultrasound sensor at the side of the steering direction can be controlled as shown in FIG. 2B.

On the other hand, when the ultrasound sensor arranged at the opposite side to the steering direction of the vehicle receives the reflection wave, the possibility of the existence of the obstacle deviating from the scheduled path of the vehicle is high. In this case, the periodicity of the operation timing signal of the ultrasound sensor at the opposite side of the steering direction can be controlled in as shown in FIG. 2C or 2D.

The periodicity of the operation timing signal S1, S2, S3 can be controlled as shown in FIG. 2B, in the case where the distance (between vehicle and obstacle) calculated via the wave reception of the initial time of the ultrasound sensor $20_{RL}$ (or $20_{FR}$) which responds to the operation timing signal S1 is shorter than that of the ultrasound sensor $20_{RC}$ or the like which responds to the operation timing signal S2, S3. On the other hand, in the case where the distance calculated via the wave reception of the initial time of the ultrasound sensor $20_{RL}$ (or $20_{FR}$) which responds to the operation timing signal S1 is longer than that of the ultrasound sensor $20_{RC}$ or the like which responds to the operation timing signal S2, S3, the periodicity of the operation timing signal S1, S2, S3 can be controlled as shown in FIG. 2C or 2D.

Thus, according to this embodiment, the periodicity of the operation timing signal of the ultrasound sensor which commenced to receive the reflection wave is controlled to be shorter than the predetermined periodicity T1. Therefore, the influence of noise signal can be restricted while the detection of the obstacle can be determined during a shortened time. Moreover, the periodicity of the operation timing signal is controlled responding to the case where the shortening of the time elapsed till the determination of the obstacle detection is the main aim and the case where the elimination of the influence of noise is the main aim. Therefore, the obstacle detection can be early determined while the influence of noise can be restricted.

Next, a modification of the first embodiment will be described. In this case, each of the front bumper and the rear bumper is provided with the two ultrasound sensors.

Specifically, the ultrasound sensors $20_{FR}$ and $20_{FL}$ are respectively attached at the right end and the left end of the front bumper, and the ultrasound sensors $20_{RR}$ and $20_{RL}$ are respectively attached at the right end and the left end of the rear bumper.

The ECU 30 outputs the operation timing signals S1 and S2. The ultrasound sensors $20_{FL}$ and $20_{RR}$ are set to respond to the operation timing signal S1, and the ultrasound sensors $20_{FR}$ and $20_{RL}$ are set to respond to the operation timing signal S2.

In FIGS. 3A and 3B, "A" indicates the operation timing of the ultrasound sensor $20_{FL}$, $20_{RR}$ responding to the operation timing signal S1. "B" indicates the operation timing of the ultrasound sensor $20_{FR}$, $20_{RL}$ responding to the operation timing signal S2.

When none of the ultrasound sensors $20_{FR}$, $20_{FL}$, $20_{RR}$ and $20_{RL}$ receives the reflection wave, the ultrasound sensors $20_{FR}$, $20_{FL}$, $20_{RR}$ and $20_{RL}$ are controlled to perform the ultrasound transmission-reception operation at a predetermined periodicity T3, as shown in FIG. 3A. In the case where the ultrasound sensor $20_{RR}$ (or $20_{FL}$) commenced to receive the reflection wave, the periodicity of the operation timing signal S1 is controlled to be equal to the periodicity T2 which is shorter than the predetermined periodicity T3, while the periodicity of the operation timing signal S2 is controlled to be longer than the predetermined periodicity T3. Thus, the periodicity of the transmission-reception operation of the ultrasound sensor $20_{RR}$ (or $20_{FL}$) becomes the periodicity T2 shorter than the predetermined periodicity T3, as shown in FIG. 3B.

In this case, when the number of the continuous wave-reception times of the ultrasound sensor $20_{RR}$ or the like reaches "3", it is determined that an obstacle is detected in the detection area allotted thereto. On the other hand, when the number of the continuous wave-reception times of the ultrasound sensor $20_{RR}$ has reached "3" (that is, obstacle detection has been determined) or is smaller than "3" (that is, noise signal is received), the periodicity of the transmission-reception operation of the ultrasound sensor $20_{RR}$ or the like can be converted back into the predetermined periodicity T3.

Second Embodiment

A second embodiment of the present invention will be described with reference to FIGS. 4-6.

Figure 4:
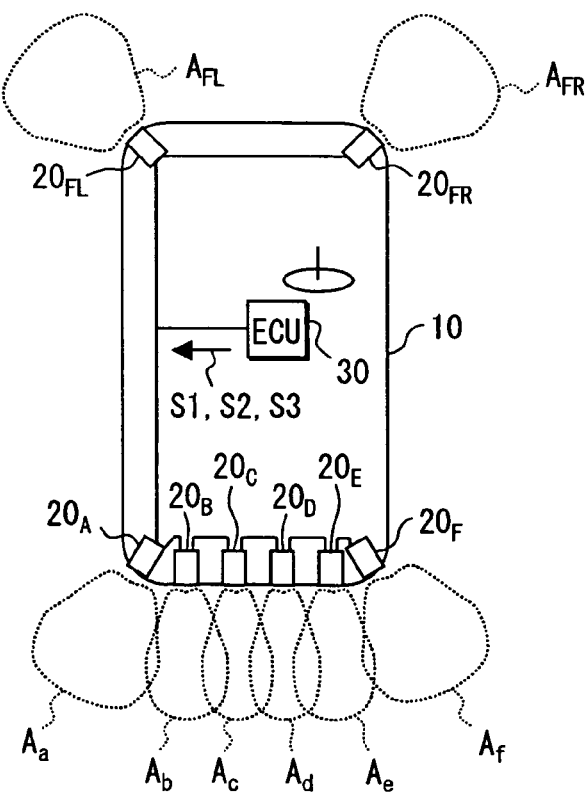
FIG. 4 is a schematic view showing a whole construction of an obstacle detection device according to a second embodiment of the present invention.

As shown in FIG. 4, six ultrasound sensors $20_A$-$20_F$ are mounted at the rear bumper of the vehicle chassis 10, and transmit and receive ultrasound signal (detection signal) respectively to detection areas $A_a$-$A_f$, which are respectively allotted to the ultrasound sensors $20_A$-$20_F$. In this case, the ultrasound sensors $20_{FL}$ and $20_{FR}$ are attached to the front bumper as described in the above-described first embodiment.

Figure 5A:
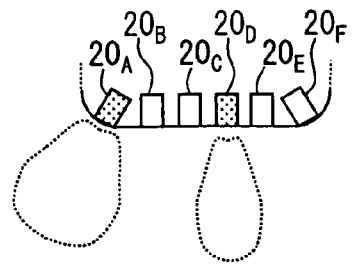
FIG. 5A is a schematic view showing transmission-reception operation objects of a group A according to the second embodiment.

The ECU 30 outputs the operation timing signals S1-S3. The ultrasound sensors $20_A$-$20_F$ are divided into three groups A, B and C. Referring to FIG. 5A, the ultrasound sensor $20_A$ and $20_D$ are set to respond to the operation timing signal S1. That is, the group A includes transmission-reception operation objects of the ultrasound sensor $20_A$ and $20_D$ responding to the operation timing signal S1.

Figure 5B:
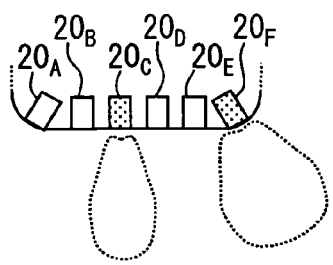
FIG. 5B is a schematic view showing transmission-reception operation objects of a group B according to the second embodiment.

Referring to FIG. 5B, the ultrasound sensors $20_C$ and $20_F$ are set to respond to the operation timing signal S2. That is, the group B includes transmission-reception operation objects of the ultrasound sensors $20_C$ and $20_F$ responding to the operation timing signal S2.

Figure 5C:
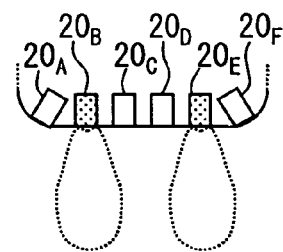
FIG. 5C is a schematic view showing transmission-reception operation objects of a group C according to the second embodiment.

Referring to FIG. 5C, the ultrasound sensors $20_B$ and $20_E$ are set to respond to the operation timing signal S3. That is, the group C includes transmission-reception operation objects of the ultrasound sensors $20_B$ and $20_E$ responding to the operation timing signal S3.

The transmission-reception operations of the ultrasound sensors $20_A$-$20_F$ are performed in the sequence of the groups A, B and C based on the operation timing signals S1-S3, as shown in FIGS. 5A-6A. That is, the transmission-reception operations of the ultrasound sensors $20_A$-$20_F$ are sequentially performed in order of the units of the groups A, B and C.

As shown in FIG. 6A, in the case where none of the ultrasound sensors $20_A$-$20_F$ receives the reflection signal, the periodicity of each of the operation timing signals S1, S2 and S3 is set as the predetermined periodicity T1.

In FIGS. 6A and 6B, "A" indicates the operation timing of the ultrasound sensor $20_A$, $20_D$ responding to the operation timing signal S1. "B" indicates the operation timing of the ultrasound sensor $20_C$, $20_F$ responding to the operation timing signal S2. "C" indicates the operation timing of the ultrasound sensor $20_B$, $20_E$ responding to the operation timing signal S3.

In the case where the ultrasound sensor $20_A$ (or $20_D$) of the group A commenced to receive the reflection wave (that is, obstacle detection via ultrasound sensor $20_A$ is not be determined yet), the periodicity of the operation timing signal S1 is controlled by the ECU 30 to be equal to the periodicity T2 which is shorter than the predetermined periodicity T1, while the periodicity of the operation timing signal S2, S3 is controlled to be larger than the predetermined periodicity T1. Thus, as shown in FIG. 6B, the periodicity of the ultrasound transmission-reception operations of the ultrasound sensors $20_A$ and $20_D$ is converted into the periodicity T2 after the ultrasound sensor $20_A$ (or $20_D$) commenced to receive the reflection wave. The ultrasound sensors of the groups B and C can be also controlled similar to the ultrasound sensor $20_A$, $20_D$.

In the case where the number of the continuous wave-reception times of any one of the ultrasound sensor $20_A$-$20_F$ reaches "3", it is determined that the obstacle is detected in the detection area allotted to this ultrasound sensor. On the other hand, when the number of the continuous wave-reception times of any one of the ultrasound sensor $20_A$-$20_F$ has reached "3" (that is, obstacle detection has been determined) or is smaller than "3" (that is, noise signal is detected), the periodicity thereof is converted back into the predetermined periodicity T1.

In the second embodiment, what has not described about the obstacle defection device is the same with the first embodiment.

Third Embodiment

A third embodiment of the present invention will be described with reference to FIGS. 7-10.

Figure 7:
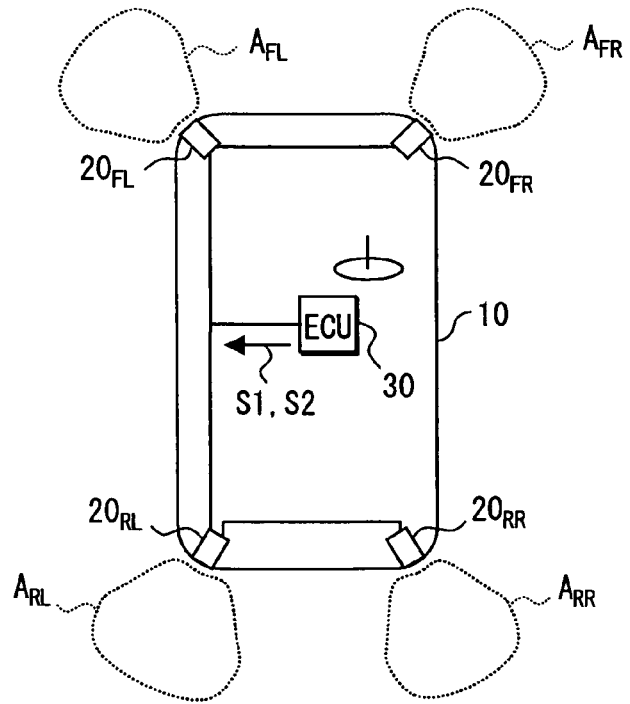
FIG. 7 is a schematic view showing a whole construction of an obstacle detection device according to a third embodiment of the present invention.
Figure 11:
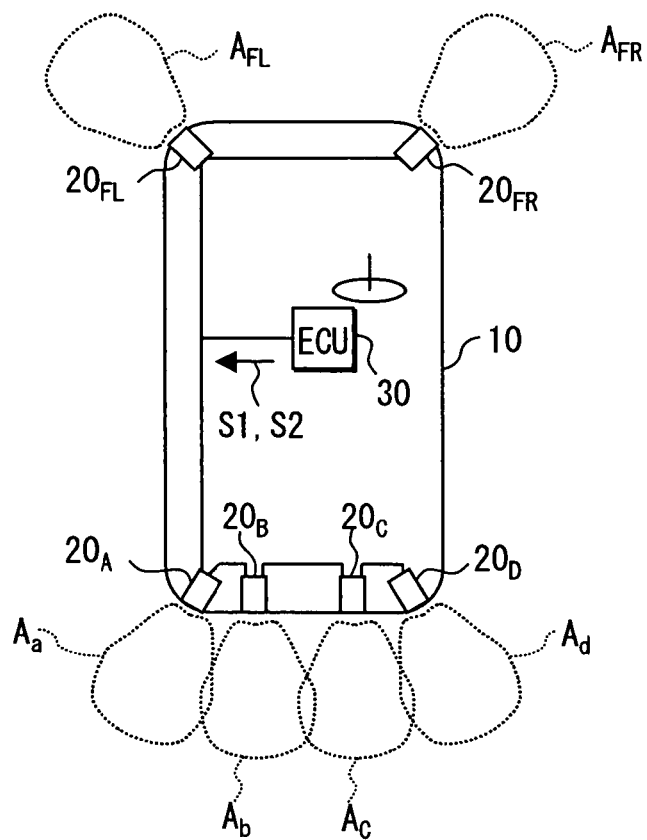
FIG. 11 is a schematic view showing a whole construction of an obstacle detection device according to a fourth embodiment of the present invention.

In this case, as shown in FIG. 7, the vehicle is provided with the four ultrasound sensors $20_{FR}$, $20_{FL}$, $20_{RR}$ and $20_{RL}$. The ultrasound sensors $20_{FR}$ and $20_{FL}$ are respectively attached to the right end and the left end of the front bumper. The ultrasound sensors $20_{RR}$ and $20_{RL}$ are respectively attached to the right end and the left end of the rear bumper. The detection areas $A_{FR}$, $A_{FL}$, $A_{RR}$ and $A_{RL}$ are respectively allotted to the ultrasound sensors $20_{FR}$, $20_{FL}$, $20_{RR}$ and $20_{RL}$.

Each of the ultrasound sensors $20_{FR}$, $20_{FL}$, $20_{RR}$ and $20_{RL}$ performs the ultrasound transmission-reception operation, for respectively sending the ultrasound burst (send wave) to the detection area allotted thereto and receiving the ultrasound burst (reflection wave) reflected by an obstacle in the case where the obstacle exists in the detection area. Moreover, the transmission-reception operation includes the send of the reflection signal corresponding to the reflection wave to the ECU 30.

The ECU 30 selectively sends the operation timing signals S1 and S2 to the ultrasound sensors 20$_{FR}$, 20$_{FL}$, 20$_{RR}$ and 20$_{RL}$ to command the timing of send wave thereof, while determining the obstacle detection in the detection areas A$_{FR}$, A$_{FL}$, A$_{RR}$ and A$_{RL}$ based on the reflection signals from the ultrasound sensors 20$_{FR}$, 20$_{FL}$, 20$_{RR}$ and 20$_{RL}$.

After the operation timing signals S1 and S2 are sent, the ECU 30 calculates the time elapsed between transmission of the send wave and reception of the reflection wave by the ultrasound sensor 20$_{FR}$, 20$_{FL}$, 20$_{RR}$, 20$_{RL}$ within the predetermined detection time T0 (referring to FIGS. 8A-8C). Thus, the distance between the vehicle and the obstacle is calculated by the ECU 30, based on the elapse time and the sound velocity.

Moreover, the ECU 30 counts the number of the continuous reception times of the reflection wave of each of the ultrasound sensors 20$_{FR}$, 20$_{FL}$, 20$_{RR}$ and 20$_{RL}$. When the number of the continuous reception times of the single ultrasound sensor 20$_{FR}$, 20$_{FL}$, 20$_{RR}$, 20$_{RL}$ is larger than or equal to the predetermined value (e.g., "3"), it is determined that there exists an obstacle in the detection area allotted to the ultrasound sensor 20$_{FR}$, 20$_{FL}$, 20$_{RR}$, 20$_{RL}$. Thus, the existence of the obstacle is informed to the driver of the vehicle by, for example, sounding the buzzer attached to the vehicle, indicating the existence of the obstacle on the indicator or the like.

In this embodiment, in order to eliminate the influence of noise, the existence of the obstacle is determined on condition that the reflection wave is continuously received for the multiple times.

Each of the operation timing signals S1 and S2 is output from the ECU 30 at a predetermined periodicity T1'. Phases of the operation timing signals S1 and S2 are different from each other, and a phase difference larger than or equal to the detection time T0 is provided therebetween. In this case, the operation timing signals S1 and S2 are output alternately.

The ultrasound sensors 20$_{RL}$ and 20$_{FR}$ are set to respond to the operation timing signal S1, and the ultrasound sensors 20$_{RR}$ and 20$_{FL}$ are set to respond to the operation timing signal S2. Thus, the transmission-reception operations of the ultrasound sensors 20$_{RL}$ and 20$_{RR}$ are alternately performed, while the transmission-reception operations of the ultrasound sensors 20$_{FR}$ and 20$_{FL}$ are performed respectively in synchronization with those of the ultrasound sensors 20$_{RL}$ and 20$_{RR}$ as shown in FIG. 8A. In FIGS. 8A-8C, "A" indicates the operation timing of the ultrasound sensor 20$_{RL}$, 20$_{FR}$ responding to the operation timing signal S1. "B" indicates the operation timing of the ultrasound sensor 20$_{RR}$, 20$_{FL}$ responding to the operation timing signal S2.

Next, the operation of the obstacle detection device according to the third embodiment will be described.

The ECU 30 selectively sends the operation timing signals S1 and S2 to the ultrasound sensors 20$_{FR}$, 20$_{FL}$, 20$_{RR}$, and 20$_{RL}$, so that each of the ultrasound sensors 20$_{FR}$, 20$_{FL}$, 20$_{RR}$, and 20$_{RL}$ performs the ultrasound transmission-reception operation. That is, the ultrasound sensor 20$_{FR}$, 20$_{FL}$, 20$_{RR}$, 20$_{RL}$ transmits the send wave to the detection area allotted thereto, and receives the reflection wave from this detection area. In the case where none of the ultrasound sensors 20$_{FR}$, 20$_{FL}$, 20$_{RR}$, and 20$_{RL}$ receives the reflection wave, the transmission-reception operation of each of the ultrasound sensors 20$_{FR}$, 20$_{FL}$, 20$_{RR}$, and 20$_{RL}$ is performed at the predetermined periodicity T1', as shown in FIG. 8A.

Referring to FIG. 8B, when the ultrasound sensor 20$_{RL}$ or the like receives the reflection wave (as shown by point-filled-in boxes of "A", "B", "C"), the ECU 30 commences to count the number of the continuous reception times of the ultrasound sensor 20$_{RL}$ or the like. In the case where the number of the continuous wave-reception times reaches the predetermined value (e.g., "3"), the existence of the obstacle in the detection area allotted to the ultrasound sensor 20$_{RL}$ or the like is informed to the driver via the buzzer, the indicator or the like.

On the other hand, referring to FIG. 8B, when the ultrasound sensor 20$_{RR}$ commenced to receive the reflection wave, the periodicity of the operation timing signal S2 of the ultrasound sensor 20$_{RR}$ is controlled by the ECU 30 to be equal to a periodicity T2' (which is shorter than the predetermined periodicity T1') while the periodicity of the operation timing signal S1 of the ultrasound sensor 20$_{RL}$ is controlled by the ECU 30 to be equal to a periodicity T3' (which is longer than the predetermined periodicity T1), on condition that the obstacle detection in the detection area allotted to the ultrasound sensor 20$_{RL}$ has been determined and the reflection-wave reception of the ultrasound sensor 20$_{RL}$ is continuous.

In the case where the number of the continuous reception times of the ultrasound sensor 20$_{RR}$ reaches "3", it is determined that an obstacle is detected in the detection area allotted to the ultrasound sensor 20$_{RR}$. Thus, the buzzer, the indicator or the like is actuated, to inform the existence of the obstacle to the driver.

Therefore, the performance of the ultrasound transmission-reception operation of the ultrasound sensor (e.g., 20$_{RR}$) which commenced to receive the reflection wave has precedence over that of the ultrasound sensor (e.g., 20$_{RL}$) via which the obstacle detection has been determined. Thus, the detection (via ultrasound sensor 20$_{RR}$, for example) of the obstacle in need of determination can be performed early.

On the other hand, in the case where the number of the continuous wave-reception times of the ultrasound sensor (e.g., 20$_{RR}$) reaches "3", the periodicity of the operation timing signal (e.g., S2) of the ultrasound sensor (e.g., 20$_{RR}$) is converted back into the predetermined periodicity T1', as shown in FIG. 8B. In this case, because the obstacle detection via the ultrasound sensor (e.g., 20$_{RR}$) has been determined and informed to the driver, the task of the determination of the existence of the obstacle via the ultrasound sensor (e.g., 20$_{RR}$) in the detection area allotted thereto has been completed. Thus, the necessity to shorten the periodicity of the transmission-reception operation of the ultrasound sensor (e.g., 20$_{RR}$) becomes low. If the periodicity of the transmission-reception operation is kept short, the influence of noise will become large.

Therefore, it is preferable that the periodicity of the transmission-reception operation of the ultrasound sensor (e.g., 20$_{RR}$) is shortened when being necessary. In this case, according to this embodiment, the periodicity of the transmission-reception operation of the ultrasound sensor (e.g., 20$_{RR}$) will be converted back into the predetermined periodicity T1' after the obstacle detection via the ultrasound sensor (e.g., 20$_{RR}$) is determined, so that the influence of noise can be substantially restricted.

Moreover, in the case where the reception of the reflection wave dies before the number of the continuous wave-reception times of the ultrasound sensor reaches "3", the periodicity of the operation timing signal to which the ultrasound sensor responds is also converted back into the predetermined periodicity T1'.

In the case where the ultrasound sensor (e.g., 20$_{RR}$) receives the reflection wave and thereafter the reception of the reflection wave dies so that the continuous wave-reception times thereof is smaller than "3", the sequent periodicity (i.e., periodicity after cease of reception of reflection wave) of the operation timing signal (e.g., S2) is converted back into the predetermined periodicity T1', referring to FIG. 8C. In this case, it is considered that the ultrasound sensor (e.g., $20_{RR}$) has received noise. Because there is no obstacle in the detection area allotted to the ultrasound sensor (e.g., $20_{RR}$), it is unnecessary to shorten the periodicity of the transmission-reception operation of the ultrasound sensor (e.g., $20_{RR}$). On the other hand, if the periodicity of the transmission-reception operation of the ultrasound sensor (e.g., $20_{RR}$) is kept short, the influence from continuous noise signal becomes large. In this case, according to this embodiment, the periodicity of the transmission-reception operation of the ultrasound sensor (e.g., $20_{RR}$) will be converted back into the predetermined periodicity T1' so that the influence of noise can be substantially restricted.

Alternatively, the periodicity of the operation timing signal can be also converted as shown in FIG. 9A. In this case, the operation timing signal S2 of the ultrasound sensor $20_{RR}$ which commenced to receive the reflection wave is provided with one periodicity of T2' (which is shorter than periodicity T1') immediately after the reception of the reflection wave, and the sequent periodicity (after the one periodicity of T2') which is converted back into the predetermined periodicity T1'.

More alternatively, the periodicity of the operation timing signal S1, S2 can be also controlled as shown in FIG. 9B. In this case, the operation timing signal S2 of the ultrasound sensor $20_{RR}$ which commenced to receive the reflection wave is provided with one periodicity of T1' immediately after the reception of the reflection wave, and a sequent periodicity (after the one periodicity of T1') which is equal to T2' (shorter than predetermined periodicity T1').

More alternatively, the periodicity of the operation timing signal S1, S2 can be also selected responding to the traveling state or the traveling ambient of the vehicle, when the ultrasound sensor responding to the operation timing signal S1, S2 receives the reflection wave. In this case, the traveling state and the traveling ambient of the vehicle can be detected based on the operation information from the vehicle velocity sensor, the shift sensor for detecting the shift position, the steering angle sensor for detecting the steering angle of the steering wheel, the rain sensor for detecting raindrop, the light control system or the like.

In the case where the early determination of the obstacle detection is preferred when the vehicle has a high traveling velocity or the obstacle is difficultly visually identified at night or the like, the periodicity of the operation timing signal S1, S2 can be controlled as shown in FIG. 8B. In the case where the elimination of the influence of noise signal such as reflection wave from raindrop and the like is the main aim, the periodicity of the operation timing signal S1, S2 can be controlled as shown in FIG. 9A or 9B.

Moreover, when the ultrasound sensor arranged at the side of the steering direction of the vehicle receives the reflection wave, the possibility of the existence of the obstacle positioned at the scheduled path of the vehicle is high so that it is necessary to early determine the detection of the obstacle and inform that to the driver. In this case, the periodicity of the operation timing signal of the ultrasound sensor at the side of the steering direction can be controlled as shown in FIG. 8B.

On the other hand, when the ultrasound sensor arranged at the opposite side to the steering direction of the vehicle receives the reflection wave, the possibility of the existence of the obstacle deviating from the scheduled path of the vehicle is high. In this case, the periodicity of the operation timing signal of the ultrasound sensor at the opposite side to the steering direction can be controlled as shown in FIG. 9A or 9B.

In the case where the distance (between vehicle and obstacle) calculated via the wave reception of the initial time of the ultrasound sensor $20_{RR}$ (or $20_{FL}$) is shorter than that calculated via the wave reception of the initial time of the ultrasound sensor $20_{RL}$ (or $20_{FR}$), the periodicity of the operation timing signal S1, S2 can be controlled as shown in FIG. 8B. In the case where the distance calculated via the wave reception of the initial time of the ultrasound sensor $20_{RR}$ (or $20_{FL}$) is longer than that calculated via the wave reception of the initial time of the ultrasound sensor $20_{RL}$ (or $20_{FR}$), the periodicity of the operation timing signal S1, S2 can be controlled as shown in FIG. 9A or 9B.

Thus, according to this embodiment, the performance of the transmission-reception operation of the ultrasound sensor which commenced to receive the reflection wave (that is, obstacle detection via the ultrasound sensor is in need of determination) has precedence over that of the ultrasound sensor via which the obstacle detection has been determined. Thus, the obstacle detection can be early determined.

Moreover, in this embodiment, the periodicity of the operation timing signal S1, S2 can be converted responding to the case where the shortening of the time elapsed till the determination of the obstacle detection is preferred or the case where the elimination of the influence of noise is preferred. Therefore, the obstacle detection can be early determined while the influence of noise can be restricted.

Alternatively, for example, when the ultrasound sensor $20_{RR}$ commenced to receive the reflection wave, as shown in FIG. 10, the periodicity of the operation timing signal S2 of the ultrasound sensor $20_{RR}$ can be controlled by the ECU 30 to be equal to the periodicity T2' (which is shorter than the predetermined periodicity T1') while the operation timing signal S1 of the ultrasound sensor $20_{RL}$ can be delayed a time T4 with respect to the periodicity T1', on condition that the obstacle detection in the detection area allotted to the ultrasound sensor $20_{RL}$ has been determined and the reflection-wave reception of the ultrasound sensor $20_{RL}$ is continuous. In this case, the delay time T4 can be arbitrarily set.

Fourth Embodiment

A fourth embodiment of the present invention will be described with reference to FIGS. 11-13C.

In this case, the four ultrasound sensors 20A-20D are mounted at the rear bumper, to transmit and receive ultrasound (i.e., performs transmission-reception operation) respectively to the detection areas Aa-Ad, which are respectively allotted to the ultrasound sensors $20_A$-$20_D$. In this case, the ultrasound sensors $20_A$ and $20_D$ are respectively mounted at the left end and the right end of the rear bumper, and the ultrasound sensors $20_B$ and $20_C$ are arranged between the ultrasound sensors $20_A$ and $20_D$. The ultrasound sensors $20_{FL}$ and $20_{FR}$ are respectively mounted at the left end and the right end of the front bumper, which is the same with the above-described third embodiment.

The ECU 30 outputs the operation timing signals S1 and S2. The ultrasound sensors $20_A$-$20_D$ are divided into two groups A and B. The group A includes transmission-reception operation objects of the ultrasound sensors $20_A$ and $20_C$, referring to FIG. 12A. The ultrasound sensor $20_A$ and $20_C$ are set to respond to the operation timing signal S1.

Figure 12A:
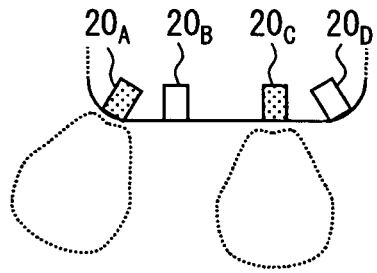
FIG. 12A is a schematic view showing transmission-reception operation objects of a group A according to the fourth embodiment.
Figure 12B:
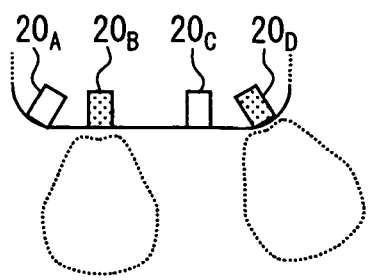
FIG. 12B is a schematic view showing transmission-reception operation objects of a group B according to the fourth embodiment.

The group B includes transmission-reception operation objects of the ultrasound sensors $20_B$ and $20_D$, referring to FIG. 12B. The ultrasound sensors $20_B$ and $20_D$ are set to respond to the operation timing signal S2. The transmission-reception operations of the ultrasound sensors $20_A$-$20_D$ are sequentially performed in order of the units of the groups A and B based on the operation timing signals S1 and S2, as shown in FIGS. 12A-13A.

In the case where none of the ultrasound sensors receives the reflection wave, the transmission-reception operation of each of the ultrasound sensors is performed at the predetermined periodicity T1', as shown in FIG. 13A.

Referring to FIG. 13B, when the ultrasound sensor 20D (or $20_B$) of the group B commenced to receive the reflection wave, the periodicity of the operation timing signal S2 of the ultrasound sensor of the group B is controlled by the ECU 30 to be equal to the periodicity T2' (which is shorter than predetermined periodicity T1') while the periodicity of the operation timing signal S1 of the ultrasound sensor $20_A$ (or $20_C$) of the group A is controlled to be equal to the periodicity T3' (which is longer than predetermined periodicity T1'), on condition that the obstacle detection in the detection area allotted to at least one of the ultrasound sensors of the group A has been determined and the reflection-wave reception of the ultrasound sensor of the group A is continuous.

In the case where the number of the continuous wave-reception times of the ultrasound sensor (e.g. $20_D$ or $20_B$ of group B) reaches "3", it is determined that the obstacle is detected in the detection area allotted thereto. Thus, the existence of the obstacle is informed to the driver by actuating the buzzer, the indicator or the like.

On the other hand, when the number of the continuous wave-reception times reached "3" or is smaller than "3", the periodicities of the signals S1 and S2 are converted back into the predetermined periodicity T1'.

The similar control to what described above with reference to FIG. 13B can be also suitably used in the case where the ultrasound sensor $20_A$ or $20_C$ of the group A commenced to receive the reflection wave (that is, obstacle detection thereof is in need of determination) and the obstacle detection in the detection area allotted to at least one of the ultrasound sensors of the group B has been determined.

Alternatively, as shown in FIG. 13C, when the ultrasound sensor (e.g., $20_D$ or $20_B$ of group B) commenced to receive the reflection wave, the periodicity of the operation timing signal S2 (to which ultrasound sensor of group B responds) is controlled by the ECU 30 to be equal to the periodicity T2' (which is shorter than predetermined periodicity T1') while the periodicity of the operation timing signal S1 (to which ultrasound sensor Of group A responds) is controlled by the ECU 30 to be equal to the periodicity T3' (which is longer than predetermined periodicity T1'), on condition that the obstacle detections in the detection areas allotted to both of the ultrasound sensors $20_A$ and $20_C$ of the group A have been determined and the reflection-wave receptions of the ultrasound sensors $20_A$ and $20_C$ of the group A are continuous.

Thus, as shown in FIG. 13C, when the ultrasound sensor $20_D$ commenced to receive the reflection wave and only the obstacle detection of the ultrasound sensor $20_A$ of the group A has been determined, the above-described control will not be performed. On the other hand, when the ultrasound sensor $20_D$ commenced to receive the reflection wave and the obstacle detections of both of the ultrasound sensors $20_A$ and $20_C$ of the group A have been determined, the above-described control will be performed.

In the fourth embodiment, what has not described about the obstacle defection device is the same with the third embodiment.

Other Embodiments

Although the present invention has been fully described in connection with the preferred embodiments thereof with reference to the accompanying drawings, it is to be noted that various changes and modifications will become apparent to those skilled in the art.

In the above-described first-fourth embodiments, the obstacle detection is determined on condition that the number of the continuous wave-reception times of the ultrasound sensor reaches the predetermined value, for example, "3". The predetermined value can be also set equal to "2", or larger than "3". Moreover, in the above-described embodiments, the same predetermined value (e.g., "3") as a criterion (for determination of obstacle detection) of the number of the continuous wave-reception times is provided for each of the ultrasound sensors of the obstacle detection device. However, the predetermined values of the ultrasound sensors can be also individually set. That is, the difference ultrasound sensors can be provided with the different predetermined values.

Furthermore, in the first and second embodiments, the periodicity of the transmission-reception operation of the ultrasound sensor which commenced to receive the reflection wave is converted into the periodicity T2 which is shorter than the predetermined periodicity T1, while the periodicity of the transmission-reception operation of the other ultrasound sensor is controlled to become longer than the predetermined periodicity T1. However, the ECU 30 can also shorten the periodicity of the transmission-reception operation of the ultrasound sensor which commenced to receive the reflection, without changing the periodicity of the transmission-reception operation of the other ultrasound sensor.

In the first embodiment, the transmission-reception operations are sequentially performed in order of the ultrasound sensors $20_{RL}$, $20_{RC}$ and $20_{RR}$. However, the transmission-reception operations can be also performed in other sequence. In the second embodiment, the transmission-reception operations are sequentially performed in order of the groups A, B and C. However, the transmission-reception operations can be also performed in other sequence.

Moreover, in the first-fourth embodiments, the ultrasound sensor can be also attached to a fender, a door and the like of the vehicle, instead of the front bumper and the rear bumper.

In the second and fourth embodiments, each of the ultrasound sensors is arranged to respond to one of the operation timing signals. However, the single ultrasound sensor can be also set to respond to the multiple operation timing signals. That is, the single ultrasound sensor can also belong to the multiple groups.

Furthermore, in the second and fourth embodiments, each of the groups includes the two ultrasound sensors. However, the group can also include the one ultrasound sensor or the ultrasound sensors totaling to a number larger than or equal to "3". Moreover, the relative position relation of the ultrasound sensors belonging to the same group is not limited. For example, the ultrasound sensors which are adjacent to each other can also belong to the same group.

Such changes and modifications are to be understood as being in the scope of the present invention as defined by the appended claims.

What is claimed is:

1. An obstacle detection device, comprising:
a plurality of detection units which are respectively assigned to a plurality of detection areas to perform signal transmission-reception operations with respect to the detection areas, the signal transmission-reception operation of each said detection unit including sending of a detection signal to a respectively associated detection area allotted thereto and reception of a reflection signal from the detection area allotted thereto;
an electronic control unit having a central processing unit, memory and input/output ports, said electronic control unit being configured to function as an operation control unit which controls a detection unit to perform a signal transmission-reception operation responding to at least one of a plurality of kinds of operation timing signals, which are repeated at a predetermined periodicity; and
said electronic control unit also being configured to function as a determination unit which counts a number of continuous reception times of the reflection signal of a detection unit, and determines detection of an obstacle in the detection area allotted to a respectively associated detection unit when the number of the continuous reception times is larger than or equal to a predetermined value,
wherein the signal transmission-reception operation of a detection unit which commences to receive the reflection signal is provided by the operation control unit with an operation timing signal having a periodicity shorter than the predetermined periodicity, and
wherein when the reception of the reflection signal by a detection unit dies before the number of the continuous reception times thereof reaches the predetermined value, the periodicity of the operation timing signal to which that detection unit responds is converted by the operation control unit back into the predetermined periodicity.

2. The obstacle detection device according to claim 1, wherein:
when the number of the continuous reception times of one of said detection units reaches the predetermined value, the periodicity of the operation timing signal to which that detection unit responds is converted by the operation control unit back into the predetermined periodicity.

3. The obstacle detection device according to claim 1, wherein:
each said detection unit is an ultrasound sensor, which sends an ultrasound signal to the detection area allotted thereto based on the operation timing signal and receives an ultrasound signal reflected from the detection area.

4. The obstacle detection device according to claim 1, wherein:
the signal transmission-reception operations of the plurality of detection units are sequentially performed; and
when one of said detection units commences to receive the reflection signal, a sequent periodicity of the operation timing signal to which the one detection unit responds is controlled to be shorter than the predetermined periodicity and a periodicity of the different operation timing signal from that of the one detection unit is controlled to be longer than the predetermined periodicity, on condition that an obstacle detection via a respectively corresponding other detection unit has been determined and the reception of the reflection signal by the other detection unit is continuous,
the other detection unit performing the signal transmission-reception operation at the different operation timing signal from that of the one detection unit.

5. The obstacle detection device according to claim 1, wherein:
the signal transmission-reception operations of the plurality of detection units are sequentially performed; and
when one of said detection units commences to receive the reflection signal, a sequent periodicity of the operation timing signal to which the one detection unit responds is controlled to be shorter than the predetermined periodicity and a periodicity of the different operation timing signal from that of the one detection unit is controlled to be longer than the predetermined periodicity, on condition that obstacle detections via respectively corresponding other of said detection units have been determined and the receptions of the reflection signal by the other of said detection units are continuous,
the other of said detection units including all of the detection units which perform the signal transmission-reception operations at the different operation timing signals from that of the one detection unit.

6. The obstacle detection device according to claim 4, wherein:
when the reception of the reflection signal by the one detection unit dies before the number of continuous reception times thereof reaches the predetermined value, the periodicity of the operation timing signal to which said one detection unit responds is converted by the operation control unit back into the predetermined periodicity.

7. The obstacle detection device according to claim 4, wherein:
when the number of the continuous reception times of said one detection unit reaches the predetermined value, the periodicity of the operation timing signal to which said one detection unit responds is converted by the operation control unit back into the predetermined periodicity.

8. The obstacle detection device according to claim 1, wherein:
the signal transmission-reception operations of the plurality of detection units are sequentially performed; and
when one of said detection unit commences to receive the reflection signal, an average of sequent periodicities of the operation timing signal to which said one detection unit responds is controlled to be shorter than the predetermined periodicity and a different operation timing signal from that of said one detection unit is delayed a predetermined period, on condition that an obstacle detection another of said detection units has been determined and the reception of the reflection signal by a respectively corresponding other of said detection unit is continuous,
the other of said detection units performing the signal transmission-reception operation at the different operation timing signal from that of said one detection unit.

9. The obstacle detection device according to claim 4, wherein:
each of said detection units is an ultrasound sensor, which sends an ultrasound signal to the detection area allotted thereto based on the operation timing signal and receives an ultrasound signal reflected from the detection area allotted thereto.

10. The obstacle detection device according to claim 1, wherein the operation control unit and the determination unit of the electronic control unit selectively send the plurality of kinds of operation timing signals to the plurality of detection units and determine obstacle detection in the detection areas respectively allotted to detection units based on the reflection signals therefrom.

11. The obstacle detection device according to claim 10, wherein the electronic control unit comprises a programmed microcomputer.

12. The obstacle detection device according to claim 5, wherein:
when the reception of the reflection signal by the one of said detection units dies before the number of continuous reception times thereof reaches the predetermined value, the periodicity of the operation timing signal to which the one of said detection units responds is converted by the operation control unit back into the predetermined periodicity.

13. The obstacle detection device according to claim 5, wherein:
when the number of continuous reception times of the one of said detection units reaches the predetermined value, the periodicity of the operation timing signal to which the one of said detection units responds is converted by the operation control unit back into the predetermined periodicity.

14. An automated obstacle detection method comprising using an automated control unit to:
perform signal transmission-reception operations with respect to a plurality of detection areas respectively assigned to a corresponding plurality of detection units, the signal transmission-reception operations including sending of a detection signal to a respectively associated detection area allotted thereto and reception of a reflection signal from the detection area allotted thereto;
control each one of said detection units to perform a signal transmission-reception operation responding to at least one of a plurality of kinds of operation timing signals, which are repeated at a predetermined periodicity;
count a number of continuous reception times of the reflection signal of each of said detection units;
determine detection of an obstacle in the detection area allotted to a respectively associated detection unit when the number of the continuous reception times is larger than or equal to a predetermined value,
wherein the signal transmission-reception operation which commences to receive the reflection signal is provided with an operation timing signal having a periodicity shorter than the predetermined periodicity,
wherein, when the reception of the reflection signal by one of said detection units dies before the number of the continuous reception times thereof reaches the predetermined value, the periodicity of the operation timing signal to which that detection unit responds is converted back into the predetermined periodicity; and
output an indication of said detection of an obstacle.

15. The obstacle detection method according to claim 14, wherein:
when the number of the continuous reception times of one of said detection units reaches the predetermined value, the periodicity of the operation timing signal to which that detection unit responds is converted back into the predetermined periodicity.

16. The obstacle detection method according to claim 14, wherein:
each of said detection units is an ultrasound sensor, which sends an ultrasound signal to the detection area allotted thereto based on the operation timing signal and receives an ultrasound signal reflected from the detection area.

17. The obstacle detection method according to claim 14, wherein:
the signal transmission-reception operations are sequentially performed; and
when one of said detection units commences to receive the reflection signal, a sequent periodicity of the operation timing signal to which that one detection unit responds is controlled to be shorter than the predetermined periodicity and a periodicity of the different operation timing signal from that of said one detection unit is controlled to be longer than the predetermined periodicity, on condition that an obstacle detection via a respectively corresponding other one of said detection units has been determined and the reception of the reflection signal by said other detection unit is continuous,
said other detection unit performing the signal transmission-reception operation at the different operation timing signal from that of said one detection unit.

18. The obstacle detection method according to claim 14, wherein:
the signal transmission-reception operations are sequentially performed; and
when one of said detection units commences to receive the reflection signal, a sequent periodicity of the operation timing signal to which that one detection unit responds is controlled to be shorter than the predetermined periodicity and a periodicity of the different operation timing signal from that of said one detection unit is controlled to be longer than the predetermined periodicity, on condition that obstacle detections via respectively corresponding other ones of said detection units have been determined and the receptions of the reflection signal by the other ones of said detection units are continuous,
said other ones of said detection units including all of said detection units which perform the signal transmission-reception operations at the different operation timing signals from that of said one detection unit.

19. The obstacle detection method according to claim 17, wherein:
when the reception of the reflection signal by said one detection unit dies before the number of continuous reception times thereof reaches the predetermined value, the periodicity of the operation timing signal to which said one detection unit responds is converted by the operation control unit back into the predetermined periodicity.

20. The obstacle detection method according to claim 17, wherein:
when the number of the continuous reception times of said one detection unit reaches the predetermined value, the periodicity of the operation timing signal to which said one detection unit responds is converted by the operation control unit back into the predetermined periodicity.

21. The obstacle detection method according to claim 14, wherein:
the signal transmission-reception operations of the plurality of detection units are sequentially performed; and
when one of said detection units commences to receive the reflection signal, an average of sequent periodicities of the operation timing signal to which said one detection unit responds is controlled to be shorter than the predetermined periodicity and a different operation timing signal from that of said one detection unit is delayed a predetermined period, on condition that an obstacle detection via the other detection unit has been determined and the reception of the reflection signal by a respectively corresponding another one of said detection units is continuous, said another one of said detection units performing the signal transmission-reception operation at the different operation timing signal from that of said one detection unit.

22. The obstacle detection method according to claim 17, wherein:
each of said detection units is an ultrasound sensor, which sends an ultrasound signal to the detection area allotted thereto based on the operation timing signal and receives an ultrasound signal reflected from the detection area allotted thereto.

23. The obstacle detection method according to claim 14, wherein the controlling and the counting steps are performed by an electronic control unit, which selectively sends the plurality of kinds of operation timing signals to the plurality of detection units and determines the obstacle detection in the detection areas respectively allotted to detection units based on the reflection signals therefrom.

24. The obstacle detection method according to claim 23, wherein the electronic control unit comprises a programmed microcomputer.

25. The obstacle detection method according to claim 18, wherein:
when the reception of the reflection signal by said one detection unit dies before the number of continuous reception time thereof reaches the predetermined value, the periodicity of the operation timing signal to which said one detection unit responds is converted back into the predetermined periodicity.

26. The obstacle detection method according to claim 18, wherein:
when the number of continuous reception times of said one detection unit reaches the predetermined value, the periodicity of the operation timing signal to which said one detection unit responds is converted back into the predetermined periodicity.

* * * * *